United States Patent
Ng

(10) Patent No.: US 6,684,287 B1
(45) Date of Patent: Jan. 27, 2004

(54) TURNING READ/WRITE PERFORMANCE FOR DISK DRIVES WITH VERY HIGH TRACK DENSITY

(75) Inventor: Spencer Ng, San Jose, CA (US)

(73) Assignee: Hitachi Global Storage Technologies (NL)

( * ) Notice: Subject to any disclaimer, the term of this patent is extended or adjusted under 35 U.S.C. 154(b) by 0 days.

(21) Appl. No.: 09/400,921

(22) Filed: Sep. 21, 1999

(51) Int. Cl.⁷ .............................................. G06F 12/00
(52) U.S. Cl. ..................... 711/4; 360/78.01; 711/112
(58) Field of Search .................... 711/4, 100, 111, 711/112, 154, 167, 169, 170; 369/43; 360/78.01, 22, 78.08

(56) References Cited

U.S. PATENT DOCUMENTS

| | | | |
|---|---|---|---|
| 3,710,358 A | 1/1973 | Gindi | 340/174.1 B |
| 4,062,047 A | 12/1977 | Scull | 360/26 |
| 4,519,006 A | 5/1985 | Nakamichi | 360/76 |
| 4,539,615 A | 9/1985 | Arai et al. | 360/121 |
| 4,686,470 A | 8/1987 | Bond | 324/207 |
| 4,686,588 A | 8/1987 | Goto et al. | 360/76 |
| 5,444,583 A * | 8/1995 | Ehrlich et al. | 360/78.09 |
| 5,613,155 A * | 3/1997 | Baldiga et al. | 710/5 |
| 5,664,145 A * | 9/1997 | Apperley et al. | 711/117 |
| 5,729,718 A * | 3/1998 | Au | 711/111 |
| 5,784,220 A * | 7/1998 | Nishimura et al. | 360/78.04 |
| 5,790,341 A | 8/1998 | Cunningham | 360/76 |
| 6,105,104 A * | 8/2000 | Guttmann et al. | 711/4 |
| 6,134,063 A * | 10/2000 | Weston-Lewis et al. | 711/4 |
| 6,195,218 B1 * | 2/2001 | Guttmann et al. | 360/48 |

FOREIGN PATENT DOCUMENTS

| | | | |
|---|---|---|---|
| EP | 0 479701 A2 * | 4/1992 | G11B/21/10 |
| JP | 6455721 | 3/1989 | G11B/5/56 |
| JP | 6455722 | 3/1989 | G11B/5/56 |
| JP | 5159201 | 6/1993 | G11B/5/012 |
| JP | 6203350 | 7/1994 | G11B/5/56 |

OTHER PUBLICATIONS

IBM TDB vol. 20, No. 5, Oct. 1977, pps. 1897–1901.
IBM TDB vol. 16, No. 6, Nov. 1973, pps. 1863–1864.

* cited by examiner

Primary Examiner—Pierre-Michel Bataille
(74) Attorney, Agent, or Firm—Lacasse & Associates, LLC; Randy W. Lacasse; Thomas R. Berthold, Esq.

(57) ABSTRACT

When writing to a hard disk drive, an effective track skew is used which differs from the track skew used when reading from the disk. During reads from the disk, the disk controller uses a traditional logical track layout and logical block address (LBA) numbering having a track skew value related to read settle time. A different effective track skew value, optimized for write settle time, is used, however, when writing to the disk. Logical blocks are written to the disk out-of-sequence in order to accommodate this different effective track skew value.

2 Claims, 8 Drawing Sheets

FIG. 6

TURNING READ/WRITE PERFORMANCE FOR DISK DRIVES WITH VERY HIGH TRACK DENSITY

BACKGROUND OF THE INVENTION

1. Field of Invention

The present invention relates generally to rotating disk type data storage devices. The method and apparatus of this invention has particular application to enhancing a disk's data transfer rate.

2. Discussion of Prior Art

On a hard disk drive, data is stored in the magnetic coating of a disk. A transducer, usually called "the head", is held on an actuator arm and used to read and write data. A drive normally consists of multiple disks with each disk having a pair of associated heads, one head for the top surface and one head for the bottom surface. The disks rotate around their center at a constant rate, typically measured in RPMs.

Data is organized on the drive in cylinders, tracks, and sectors. Tracks are concentric rings on a disk and are similar in appearance to the annual rings of a tree. The number of tracks on a disk varies from one drive to another but ranges from in the tens to in the thousands. Tracks are typically numbered from the outermost to the innermost.

A cylinder refers to the collection of all similarly numbered tracks from all the disks. As disks are normally vertically stacked, the term "cylinder" is actually visually descriptive of the similarly numbered tracks.

Each track is further divided into sectors. The number of physical sectors per track was traditionally the same for every track; but now, most disk drives use zoned bit recording which places more physical sectors on the outer tracks of each disk.

The details of the physical layout of the hard disk drive are hidden from the computer system using a hard disk controller. The controller performs mapping between logical drive addresses and physical drive addresses. Two common mappings are logical sector addressing and logical block addressing. These mappings allow a computer to refer to data using logical addresses while the disk controller ensures the data is written to the correct physical location.

Traditionally, three types of mapping strategies have developed. Vertical mapping accesses data on an entire cylinder, starting from the top track and ending at the bottom track, before moving to the next cylinder. Horizontal mapping accesses data from the outer track to the inner track on a disk surface before switching to the next disk surface. Finally, combination mapping uses both vertical and horizontal strategies.

As previously mentioned, a head is used to read data from or write data to a disk. When data exceeds the storage capability of a single track, the data is split between multiple tracks. The time it takes for the head to move from one track to the next and to use embedded servo information to ensure it is correctly positioned for the next read is called read settle time. When writing data across multiple tracks a similar delay is present which is referred to as write settle time.

The problem created by these settle times hinders disk performance by reducing the sustained data transfer rate. As an example, for a track having 16 sectors, data read from track 1 starts at sector 1 and proceeds sequentially to sector 16, the last sector in the track. Reading then continues on track 2 at sector 1. However, during the read settle time, the disk keeps spinning and the first few sectors (of track 2) actually rotate past the head. By the time the head is capable of reading data, the sector beneath it is no longer sector 1. Consequently, the drive must wait for the disk to continue rotating until sector 1 is underneath the head again.

The above problem is avoided by track skew which offsets the starting sectors on adjacent tracks to minimize the wait for the first sector when switching tracks.

Similarly, problems caused by write settle time may also be addressed with track skew; noting, however, that write settle time frequently exceeds read settle time and requires a greater skew value. Determining a value for track skew, therefore, has historically been a compromise and does not optimize a disk drive's sustained data rate for either reading or writing.

Whatever the precise merits and features of the prior art in this field, the earlier art does not achieve or fulfill the purposes of the present invention. A track skew value optimized for a smaller read settle time is not provided for in the prior art, and neither is a logical write skew, different than the read skew, which is used when writing to the disk.

SUMMARY OF THE INVENTION

A disk drive's logical track layout uses a skew needed to compensate for a read settle time. Also, the LBA numbering scheme for the drive follows this logical track layout. Read operations, therefore, proceed exactly as expected, similar to present hard drives. On writes, however, the drive controller switches to a "write logical track" layout which uses an effective skew that is optimized for a write settle time. Doing so necessitates buffering write data and writing logical blocks to the drive out of sequence.

BRIEF DESCRIPTION OF THE DRAWINGS

FIG. 6 illustrates a linear depiction of 3 tracks having a logical track layout different than a write logical track layout according to the present invention.

DESCRIPTION OF THE PREFERRED EMBODIMENTS

Figure 1:
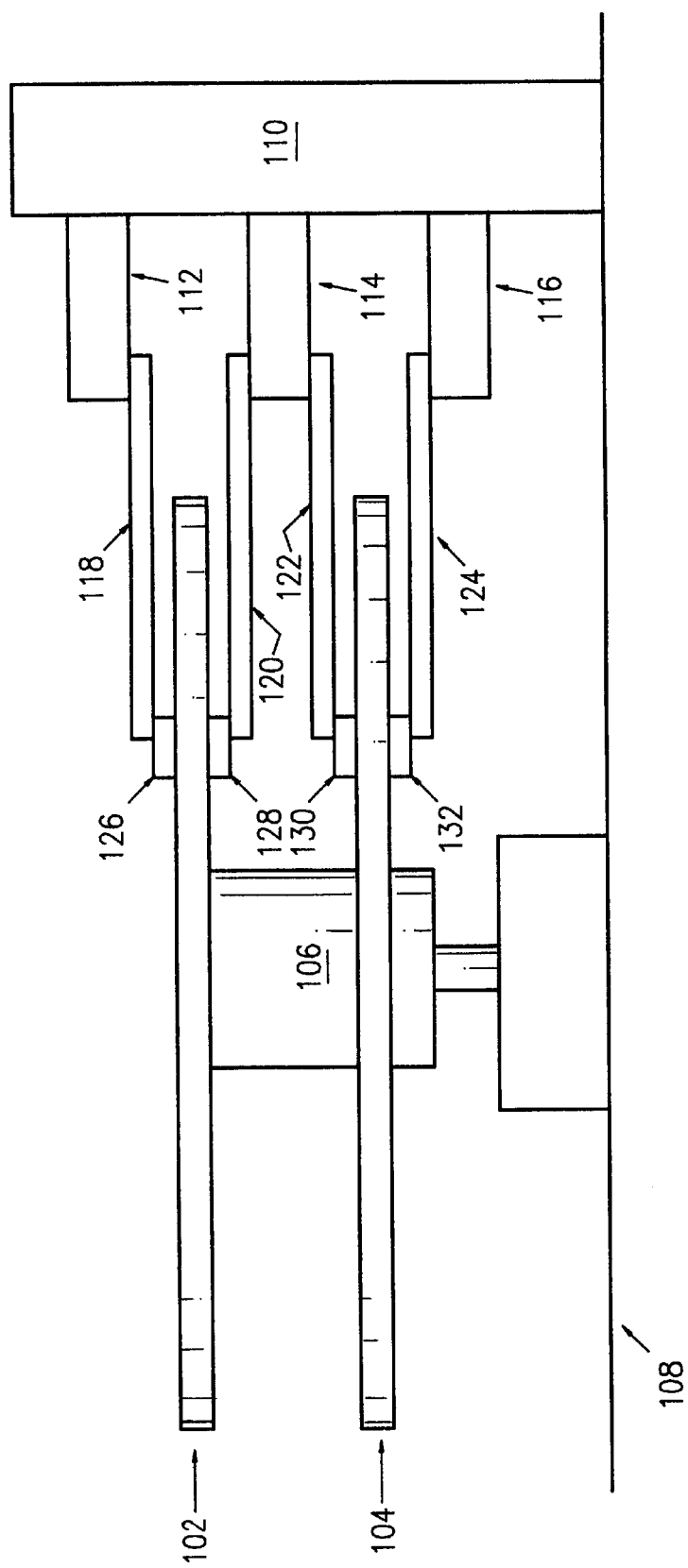
FIG. 1 illustrates the major sub-assemblies of a disk drive which utilizes the present invention.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

An inside view of a hard disk drive which benefits from the present invention is illustrated in FIG. 1. Disk platters 102 and 104 are rotatable by spindle motor 106 which rests on base 108. Support shaft 110 has arms 112, 114, and 116 and flexures 118, 120, 122, and 124 which terminate in read/write transducer heads 126, 128, 130, and 132 respectively.

A number of different specific types of physical components are contemplated within the scope of the present invention. Disk platters 102 and 104 are typically constructed of a glass-ceramic composite but aluminum-alloy platters are functionally equivalent alternatives. Furthermore, the magnetically retentive media on platters 102 and 104 is preferably a thin-film media, either sputtered or plated, but functionally equivalent oxide media and others are also within the scope of the present invention. Magneto-Resistive (MR) heads generally provide better performance; however, other functionally equivalent heads include, but are not limited to, ferrite heads, metal-in-gap heads, and thin-film heads. The head actuators are preferably voice coil motors (VCM), as depicted in FIG. 2, although a stepper motor is one functionally equivalent alternative.

Figure 2:
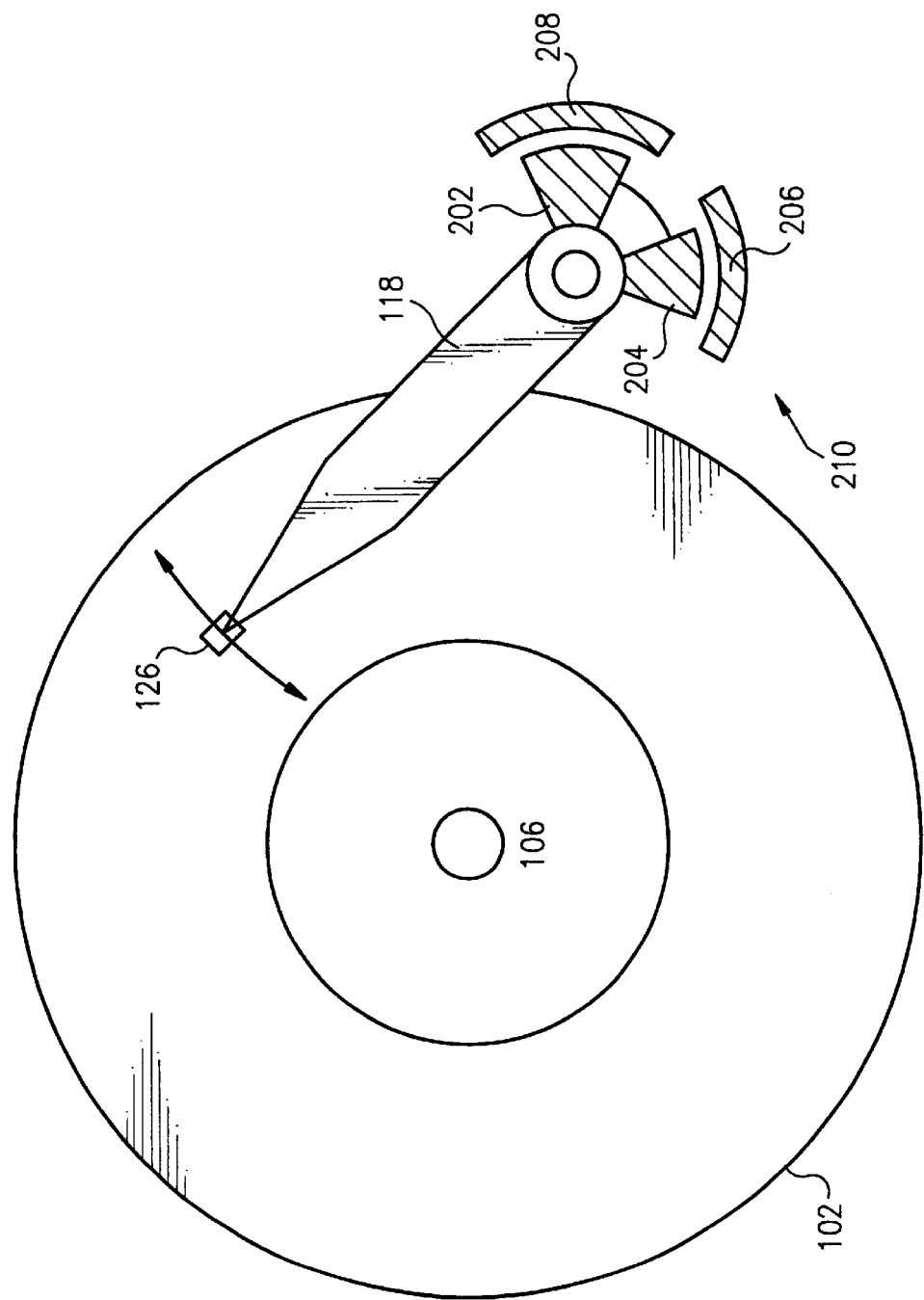
FIG. 2 illustrates a top view of details regarding a disk platter and head mechanism for the disk drive of FIG. 1.

FIG. 2 illustrates a top-view of single disk platter 102 with VCM actuator 210. Actuator 210 is comprised of movable coils 202 and 204 and stationary magnetic circuits 206 and 208. Energizing motor 210 causes head 126 to travel across the surface of platter 102.

Data is organized on the disk platters 102 and 104 in concentric rings called tracks. The tracks are themselves further divided into sectors.

The number of tracks on a disk varies from around a hundred to more than one thousand depending on the manufacturer. Historically IBM compatible disk formats had 17 sectors per track; however, since the mid-1990s disks having over 100 sectors per track have become common.

Figure 3:
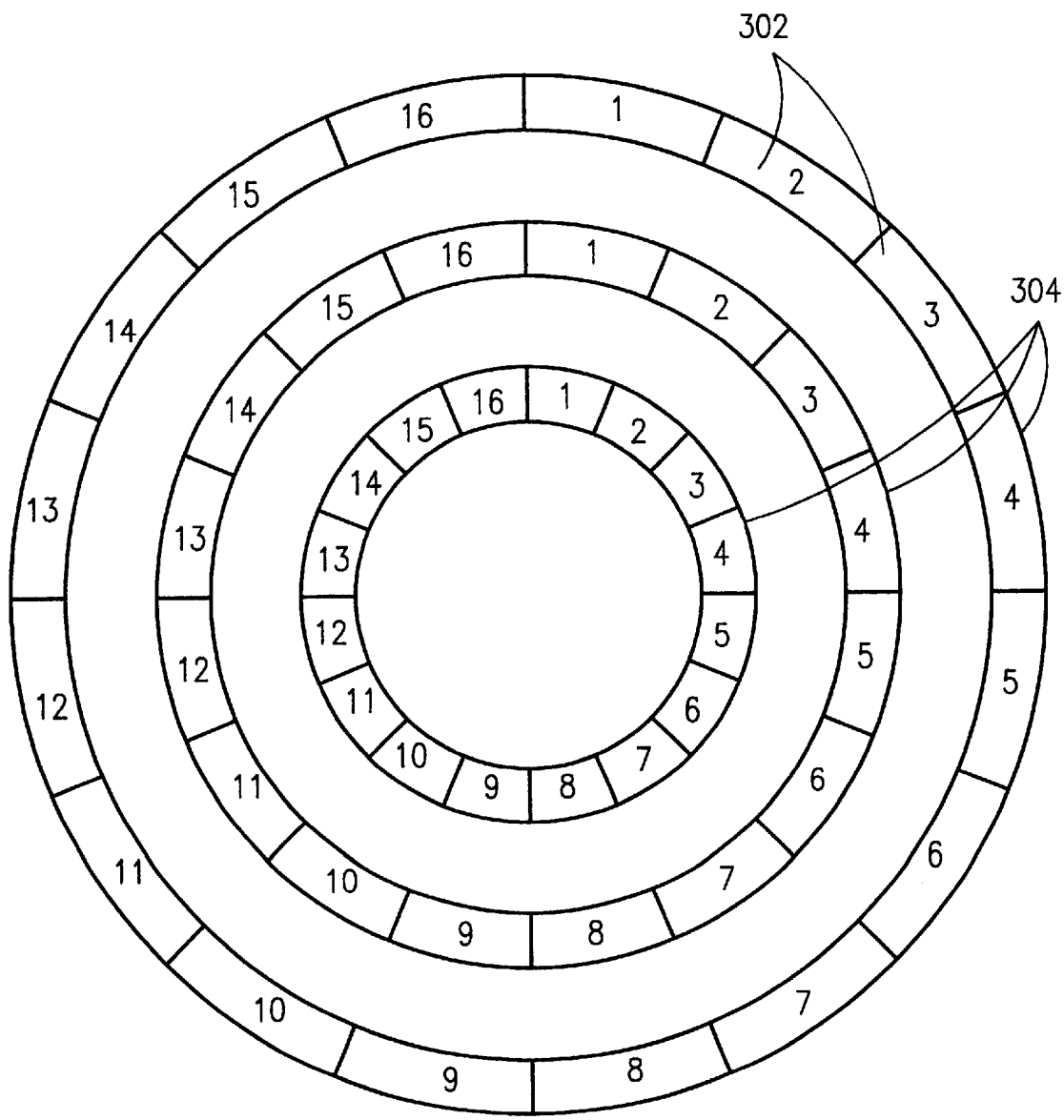
FIG. 3 illustrates an idealized physical sector layout for a disk platter having 3 tracks of 16 sectors each.

FIG. 3 illustrates a simplified view of the physical track layout of a disk platter. There are 3 tracks 304 depicted, each with 16 sectors 302. In physical terms, like numbered sectors occur at the same location in each track.

Figure 4:
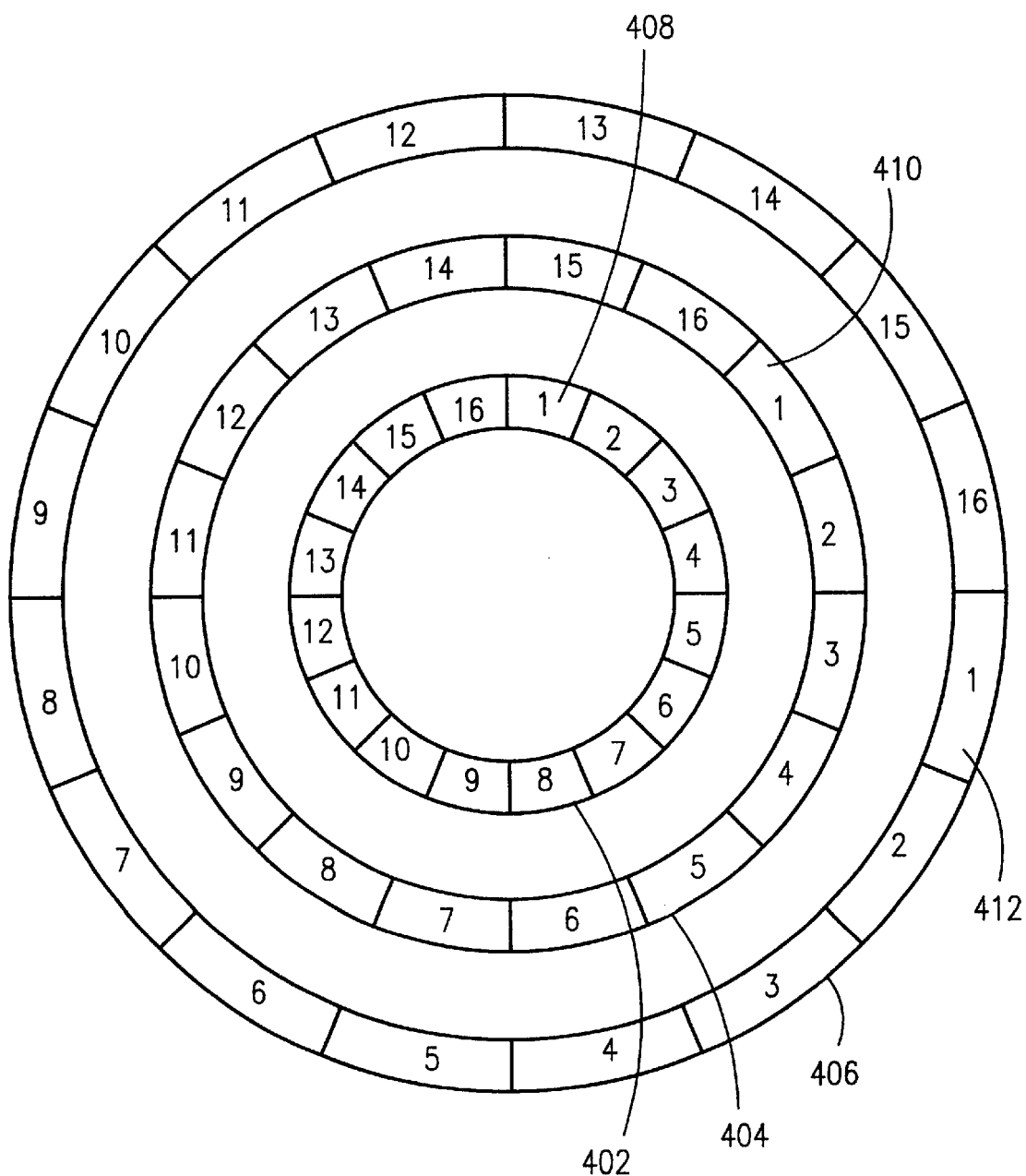
FIG. 4 illustrates an idealized logical sector layout of the disk platter in FIG. 3 with a track skew value of 2.

FIG. 4 illustrates a simplified view of an example logical track layout of the same platter illustrated in FIG. 3. In this figure, each successive track (from innermost to outermost) has its starting logical sector offset by a skew of 2 in relation to its adjacent track. A hard disk manufacturer typically determines the track skew needed to compensate for latency times related to head movement and sector acquisition.

Modern computer systems frequently manipulate and access hard disk drive data using logical block addressing (LBA). This mapping scheme addresses the sectors on a disk from 1 to n, where n is the total number of sectors on the disk drive. Furthermore, LBA mapping typically relies on the underlying logical sector layout rather than the disk's physical sector layout.

Figure 5:
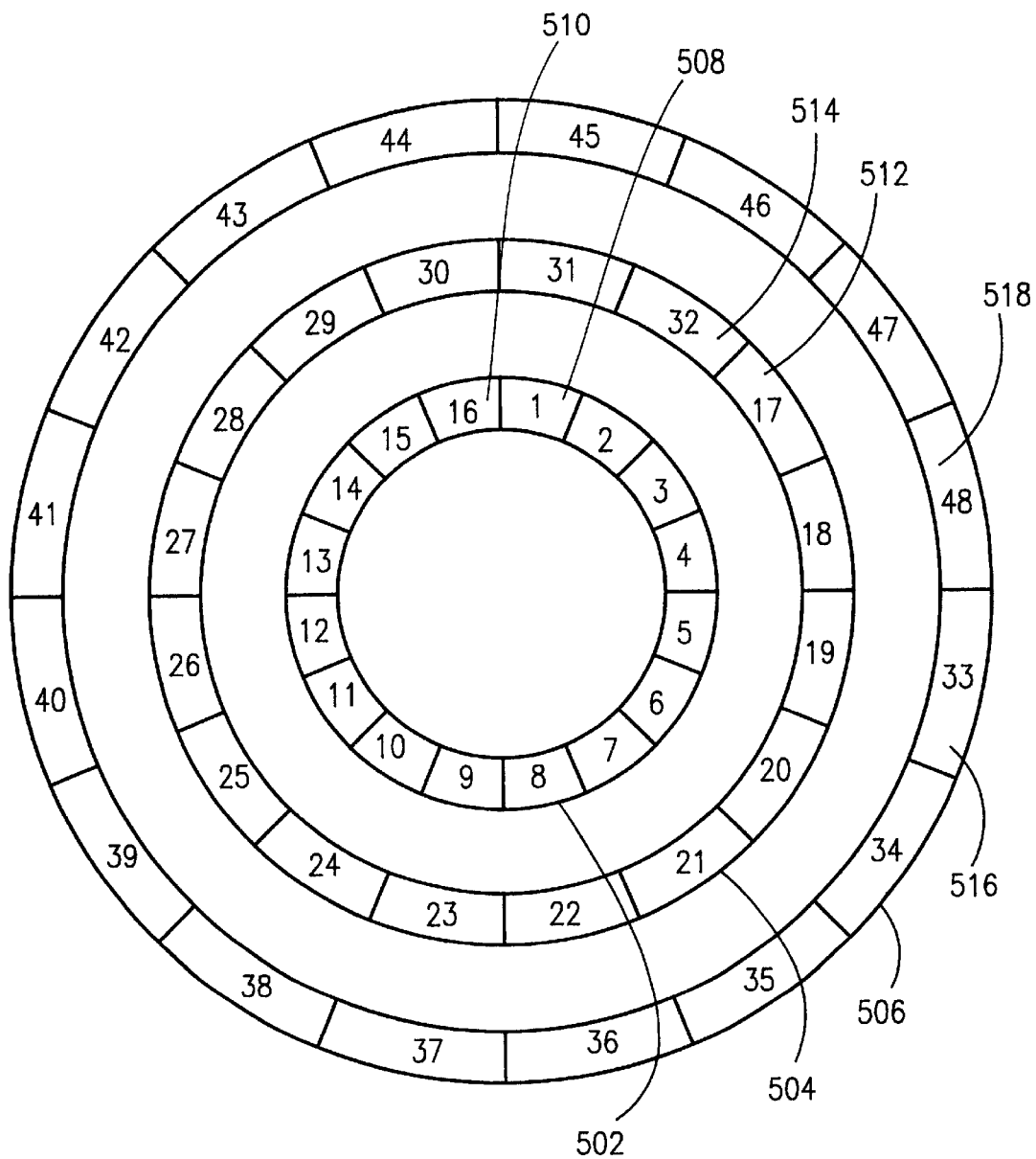
FIG. 5 illustrates an idealized LBA layout on a disk platter having the logical layout depicted in FIG. 4.

FIG. 5 illustrates the same example disk from FIGS. 3 and 4, but depicts the LBA layout of the sectors. In use, a computer system needing to read LBA data blocks 1 through 48 directs a disk controller to start reading LBA sector 1 (508) (equivalently track 1, logical sector 1 (408)) and read sequentially until LBA sector 16 (510). The disk controller then moves the head to track 2 (504), waits for LBA sector 17 (512) to arrive under the disk head and then sequentially reads data until LBA sector 32 (514). The disk controller continues by moving the head to track 3 (506) and reading data from LBA sector 33 (516) (equivalently track 3, logical sector 1 (412)) until finishing at LBA sector 48 (518).

In the above steps the disk controller uses its programmed knowledge about the disk's physical layout and logical layout to accomplish the necessary mapping operations. The computer system's operating system or other higher-level software in the controller has the responsibility for translating LBA addresses into logical track layout addresses. The mapping from logical track layout to physical track layout is usually accomplished by low-level routines in the disk controller. The innovative aspects of the present invention are not directed towards new logical-to-physical mapping schemes and the use of current mapping schemes such as vertical mapping, horizontal mapping, combination mapping, zoned bit recording, as well as others and future mapping schemes are all considered within the scope of the present invention.

Another common aspect of modern hard disk drives is the use of servo information embedded within tracks and sectors. This coded information allows a disk controller to identify the head's location on the disk. By using this information in a feedback control system, the disk's head position can not only be detected but also corrected. The servo information typically identifies physical layout parameters of the disk which the disk controller reverse maps to logical layout parameters as needed for internal and external operations. Servo schemes such as wedge, embedded, and dedicated, as well as others, are all contemplated by the present invention.

The most simple example of adjacent tracks is a single platter with two tracks physically next to each other. With logical mapping, however, adjacent tracks are not required to be physically adjacent and are sometimes on different surfaces of a disk or even on different disks. During the following discussion of the present invention, this broader meaning of adjacent tracks is assumed.

As stated previously, moving a disk head from one track to the next involves a delay while the head moves, identifies its position, and prepares to read or write. This delay, usually referred to as settle time, is compensated for by track sector skew, or simply "track skew". Settle time is not necessarily a single, fixed quantity. It varies depending on the disk drive's temperature, data recording density, and other random variations present in all mechanical systems.

Two opposing constraints control the amount of skew to apply to sectors of adjacent tracks. The skew needs to be large enough to compensate for the head settle time. If it is not, then the disk will need to make an additional revolution before the appropriate sector once again becomes available. However, setting the skew too high reduces a drive's sustained data transfer rate. In this instance, extra revolutions are rarely necessary, but each track move includes idle time while the too distant sector finally spins into position.

To further complicate matters, write settle time is typically longer than read settle time. As disk drive areal density increases and MR heads become the standard, this difference in settle time will likely become greater still. In particular, MR heads perform wide data writes and narrow data reads which simply means that it is much easier for a head to be "on-track" while reading. Disk reads also incorporate error correcting codes which tolerate non-optimal head positioning. A write, however, has very tight positional tolerances in order to prevent interference with physically adjacent tracks. Another reason for settle time differences is that micro-jog of the read/write element is required during writes. An MR head actually consists of two elements: a read element which is magneto-resistive and a write element which is not megneto-resistive but is inductive. These two elements are not lined up squarely over any given track, but rather, have an offset relative to each other. In order to perform a write, the read element is first aligned over a track using the servo data to verify its location. The head is then slightly repositioned to move the write element to be directly over the target track. This tiny repositioning movement is called micro-jog and adds to the write settling time.

For these and a number of other reasons, write settling time is generally longer than read settling time. Therefore, setting track skew to accommodate a disk's read settle time frequently results in extra revolutions during writes; and setting track skew to accommodate a disk's write settle time reduces the sustained data rate.

The present invention addresses the dilemma by using different effective skews for disk reads and writes. The logical track layout uses a skew needed for read settle. In and of itself, this selection of skew amount offers an improvement over current disk drives which also consider write settle time when setting track skew. Also, the LBA numbering scheme follows the logical track layout as illustrated in FIG. 5. The concept of a write logical track layout is introduced to describe the effective skew rate during writes. By writing data to the disk out-of-order (in relation to LBA and logical track layout) an effective skew rate is accomplished which gives the best overall performance during writes considering the write settle time.

Figure 6:
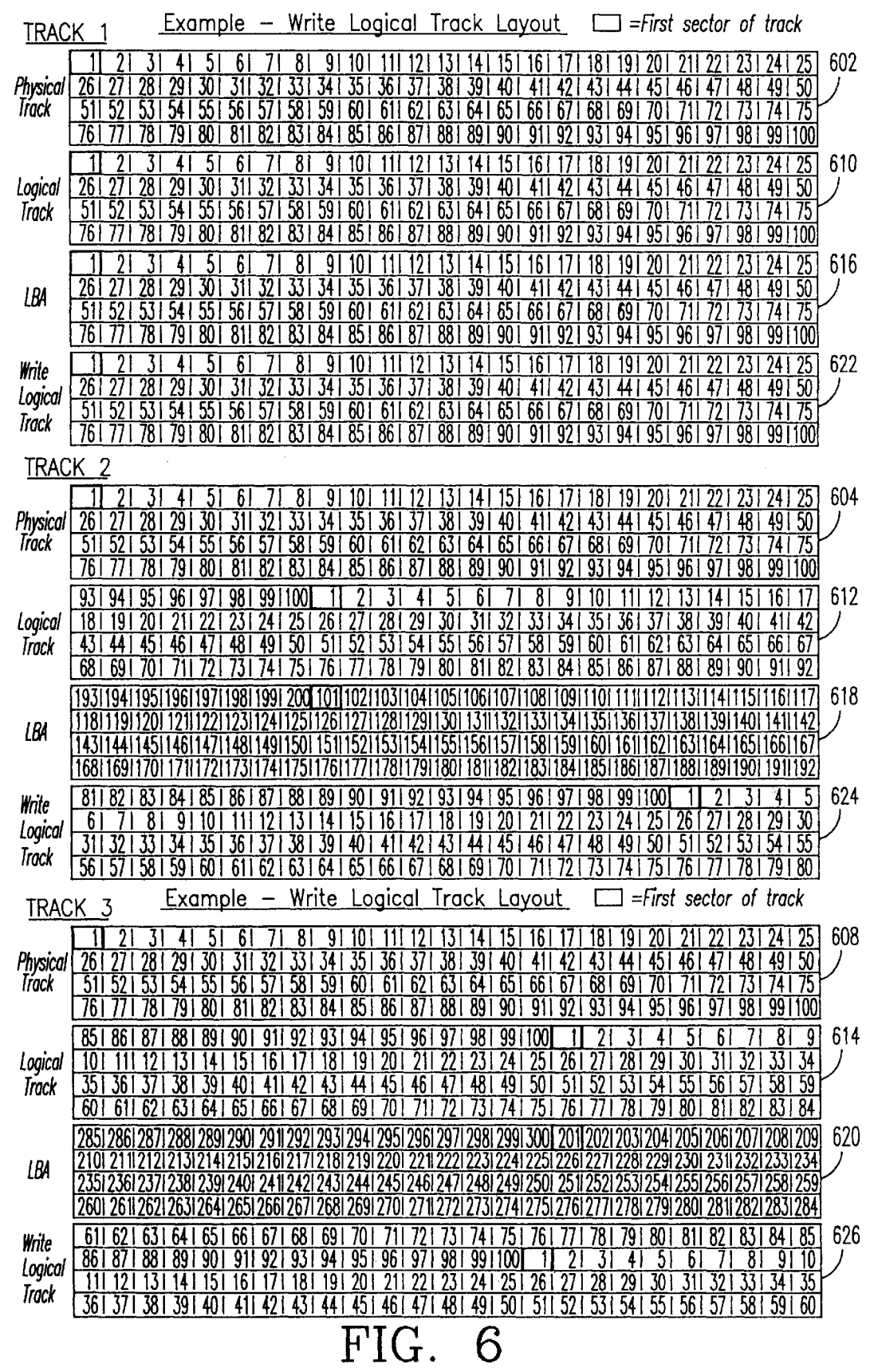

FIG. 6 illustrates an example of a write logical track layout. In the example, three tracks are depicted, each having 100 sectors. The example disk read settle time translates into a track skew of 8 and the write settle time translates into a track skew of 20. Although depicted in block form to simplify pictorial representation, the tracks are physically circular in nature as depicted in FIGS. 3 through 5.

The physical layout 602, 604 and 608, logical track layout 610, 612 and 614, and LBA scheme 616, 618 and 620 are similar to the discussions related to the earlier figures. The write logical track layout 622, 624 and 626, however, is new.

A computer system needing to write 300 blocks of data starting at LBA 1 proceeds as follows:

The head moves to track 1, logical sector 1 and writes until the last logical sector for that track. In essence, LBA 1 through LBA 100 are written.

The head moves to track 2 because the write settle time is unable to start writing for 20 physical sectors.

The logical sector at this location is 13 and the LBA is 113. So the data writing starts at logical sector 13 with LBA 113 and is labeled write logical sector 1. LBA 101 though 112 are held in a buffer until later.

Writing continues until logical sector 100 (LBA 200) is written.

The next logical sector under the head is logical sector 1 and now LBA 101 through LBA 112 are written without incurring any delay.

The head now moves to track 3 because the write settle time is unable to start writing for 20 physical sectors.

A quick look back to track 2 shows that writing ended at physical sector 20. Due to the write skew, writing proceeds at track 3 at physical sector 41 (i.e., logical sector 25 and also LBA 225). Data writing starts at logical sector 25, wherein the head writes to logical sector 1 and continues until logical sector 100 (LBA 300) is written. LBA 201 through LBA 224 are buffered.

The next logical sector under the head is logical sector 1, and now LBA 201 through 224 are written without incurring any delay.

The above illustrated example is a single instance of the more general concept of the present invention of writing data with an effective track skew different than the track skew which determines the disk's logical track layout.

Figure 7:
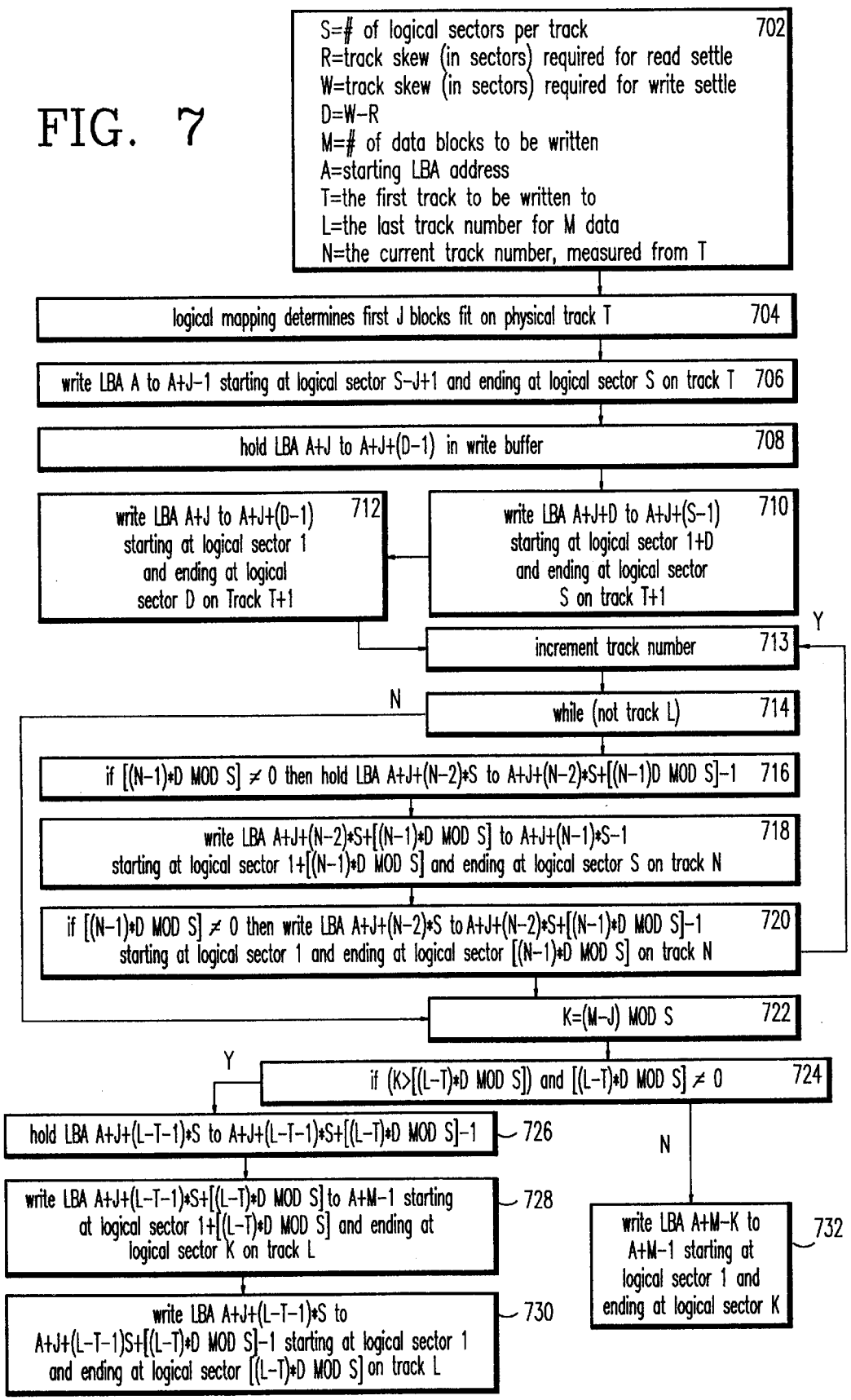
FIG. 7 illustrates a flowchart of the present invention which determines the order in which logical blocks are written to a disk.

A flowchart for a generalized algorithm implementing one aspect of the present invention is depicted in FIG. 7. Walking through the flowchart with a concrete example will likely provide a clearer explanation than a theoretical analysis of each step.

Assume a disk layout having 40 physical sectors per track, a read skew of 2 sectors and a write skew of 8 sectors. Step 702 appropriately sets the variables S, R, W and D. Specifying that 160 data blocks need to be written, starting at track 6 and LBA 231 allows step 702 to set the variables M, A, T and N.

To begin:

S=40

R=2

W=8

D=6

M=160

A=231

T=6

N=1

In step 704 the disk controller's mapping identifies that writing starts at the last 10 logical sectors of track 6. This information allows J to be set equal to 10 and L to be set equal to 10.

Writing on track T begins in step 706. LBA 231 through LBA 240 are written from logical sector 31 through logical sector 40.

Moving onto the next track increments N to 2 (not shown).

Step 708 stores LBA 241 through 246 in a buffer. This is the data which logically occurs next but cannot be written yet because the head is not yet ready to write data.

Step 710 writes LBA 247 through 280. The logical sector which is first available for writing is 7 and writing continues from there to logical sector 40 on track 7.

Step 712 continues the same physical write that was started in step 710 by writing LBA 241 though LBA 246 to logical sectors 1 through 6 on track 7.

In step 713, N is incremented by 1.

Step 714 checks to see if the last track, L, is being written. If it is then control passes to step 722; otherwise control continues with step 716.

The first time step 716 is performed, N=3 which causes LBA 281 through 292 to be held in a buffer. In this step, [(N−1)D MOD S] is compared to 0. If this comparison holds true, then the first logical sector of the current track is also the first write logical sector and there is no requirement to buffer data which will then be written out-of-order.

Step 718 writes LBA 293 through 320, on track 8, starting at logical sector 13 and ending at logical sector 40.

Step 720 continues the same physical write started in step 718 by writing LBA 281 through LBA 292 to logical sectors 1 through 12 on track 8.

In step 713, N is incremented by 1.

With N=4, step 716 continues by storing LBA 321 through 338 in a buffer.

Step 718 writes LBA 339 through 360 to logical sectors 19 through 40 on track 9.

Step 720 completes the same physical write started in step 718 by writing LBA 321 through 338 to logical sectors 1 through 18 on track 9.

In step 713, N is incremented by 1.

When track 10, the last track, is reached, K is first calculated in step 722 and step 724 then decides how to proceed.

In the present example, K=30 which is the number of blocks left to write onto the last track. According to the algorithm of the present invention, for this track, [(L−T)D MOD S] (i.e., 4×6=24) blocks need to be held in the write buffer so that writing can start with the [(L−T)D MOD S]+1 block. However, if K<=[(L−T)D MOD S] or [(L−T)D MOD S]=0, then there is no reason to store blocks because no out-of-sequence writing is needed. In the current example, the requirements of step 724 are satisfied; therefore, step 726 stores LBA 361 through LBA 384.

Step 728 writes LBA 385 through 390 to logical sectors 25 through 30 on track 10.

Step 730 finishes the physical write started in step 728 by writing LBA 361 through LBA 384 to logical sectors 1 through 24 on track 10 thereby completing the writing of all data.

If the above example were changed to write only 154 blocks of data rather than 160 blocks, then the other branch from step 724 is chosen.

In this modified example, K=24 which fails to satisfy K>[(L−T)D MOD S] and control passes to step 732.

Step 732 writes LBA 361 through LBA 384, onto track 10, starting a logical sector 1 and ending at logical sector 24.

The preferred embodiment described above assumes that while writing to the last track, there is no need for the write head to settle before writing LBA A+J+(L−T−1)S. While this assumption is most likely true, an alternative embodiment without this assumption is contemplated within the scope of this invention. This alternative modifies step 724 to add an additional test condition which must be satisfied. The quantity (S−K) represents the number of sectors after LBA A+M−1 and before LBA A+J+(L−T−1)S. If, contrary to our assumption in the preferred embodiment, the head needs to settle again in order to write LBA A+J+(L−T−1)S and (S−K)<=W, then there is no advantage to proceeding with step 726 and splitting the write operation on the last track. Therefore, in addition to the two test conditions of step 724, as illustrated in FIG. 7, this alternative embodiment adds the following test condition:

$$[(S-K)>W]$$

With this addition, step 732 is performed next if, in addition to the previous two conditions, (S−K)<=W; otherwise processing continues with step 726.

Figure 8:
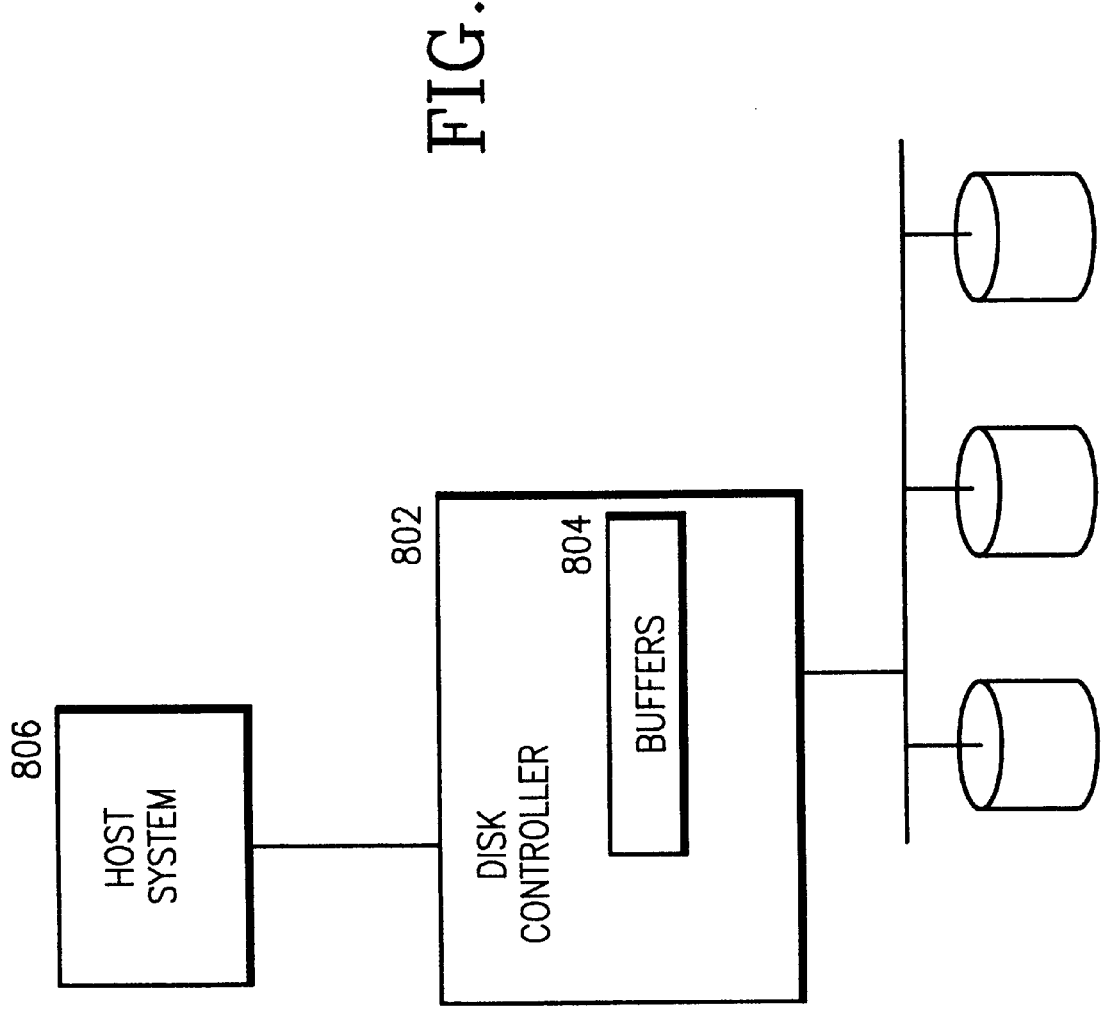
FIG. 8 illustrates the major components of a computer system utilizing the present invention.

As illustrated in FIG. 8, when instantiated in a disk controller 802, the present invention uses at least on buffer segment 804, preferably the size of a single track, to store write data. Write data for a track is received from computer system 806 and stored in a buffer segment; microcode in the disk controller cycles through the buffer segments to write data to each track.

One method which uses buffer segments 804 in accordance with the present invention, stores for the Nth track, [(N−1)D MOD S] blocks in the tail portion of the buffer and stores the remaining S−[(N−1)D MOD S] blocks at the beginning of the buffer. Which specific blocks are stored in the tail and which at the start are determined according to the algorithm described earlier in FIG. 7. For the Nth track, LBA blocks A+J+(N−2)S through A+J+(N−2)S+[(N−1)D MOD S]−1 are stored in the buffer segment tail and LBA A+J+[(N−1)D MOD S]+(N−2)S through A+J+(N−1)S−1 are stored at the start of the buffer. Controller 802 issues write commands from the beginning of the buffer to provide the data blocks in the correct write logical track layout format without any further re-arrangement.

Another functionally equivalent method is to manage each buffer segment in a circular fashion. A ring buffer, or circular buffer, moves data in and out via two pointers. The head pointer keeps track of where to place data in the buffer and the tail pointer keeps track of where to read data from the buffer. One key to its operation is that when either pointer is incremented past the end of the buffer, that pointer is reset to point to the beginning of the buffer. For each track a buffer segment stores blocks of data corresponding to logical sectors 1 though S; which according to the earlier algorithm are LBA blocks A+J+(N−2)S through A+J+(N−1)S−1. The tail pointer starts reading out data for writing at LBA A+J+[(N−1)D MOD S]+(N−2)S, proceeds to the end of the buffer (LBA A+J+(N−1)S−1), and then finishes by reading out for writing LBA A+J+(N−2)S through A+J+(N−2)S+[(N−1)D MOD S]−1 from the start of the buffer.

With either buffer segment architecture, the first and last tracks written are handled separately. Because a full track is not being written in either case, controlling the buffers requires keeping track of the actual number of sectors being written on these tracks. Simple buffer control of this type is within the ordinary skill of a practitioner in this field and not considered an inventive aspect of the present invention.

Embedded software within the disk controller is one method to implement the described algorithm for writing data to the disk with a different effective write skew.

In a preferred embodiment, the hard disk drive utilizes an ID table and servo information to locate target sectors. An ID table for a track has an entry for each servo sector of that track which identifies a data sector layout corresponding to that particular servo sector. This table allows for fast and simple identification of sectors and their locations from servo information. Microcode in a disk controller builds the ID table, which is typically a logical table, and takes into account logical skew when building the table.

In the present invention, the first track of a write operation has its ID table built according to the logical track skew value; but each subsequent track's ID table is built according to the logical write skew value described earlier. Forming the ID table in this manner allows data to be written to the disk in the order as detailed in FIG. 7 and to utilize an ID table organized according to logical write skew information.

In an alternate embodiment, the ID table is built according to a drive's physical sector layout and uses an intermediate mapping routine to translate between physical and logical locations.

The algorithm described earlier, in relation to FIG. 7, assumes a fixed skew value to compensate for write settle time which is programmed into the disk controller. Also contemplated within the scope of the present invention is a write logical track layout which is dynamically calculated for each track during the writing of data.

A dynamic method uses the servo information to determine the earliest sector which is available for writing and then fills and backfills the track accordingly. More specifically, after switching to a new track and settling, the controller determines from the servo information which physical sector is ready to write next. Utilizing the mapping schemes already present in the disk controller, writing of data blocks starts with the LBA corresponding to that first available physical location. After the last physical sector of the track is written, the controller backfills the track starting at the first physical sector and continuing until the sector just prior to the first written sector. This process is repeated for each track and each access.

CONCLUSION

A system and method has been shown in the above embodiments for the effective implementation of writing data blocks to a hard disk drive using an effective track skew different than the track skew of the disk's logical track layout. While various embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by computer operating system, computer hardware platform, disk head architecture, disk head actuators, magnetic media composition, areal density, tracks per inch, sectors per track, bytes per sector, servo arrangement, disk drive bus interface, disk data encoding method, fixed record density disks, or zoned bit recording disks. In addition, the present invention can be implemented locally on a single PC, connected workstations (i.e., networked-LAN), across extended networks such as the Internet or using portable equipment such as laptop computers or wireless equipment (RF, microwaves, infrared, photonic, etc.)

What is claimed is:

1. A method of writing data to tracks of a disk drive using a logical track layout comprising the steps:
    a. identifying a plurality of data blocks to be written to said disk drive, wherein each of said plurality of data blocks have an associated logical block address (LBA);
    b. identifying a plurality of tracks on said disk drive to write said plurality of data blocks to, wherein each of said plurality of tracks is comprised of a plurality of logical sectors;
    c. determining a first set of data blocks, selected from said plurality of data blocks, to be written to first track of said plurality of tracks;
    d. writing said first set to said first track;
    e. for each subsequent track of said plurality of tracks, prior to a last track of said plurality of tracks, performing the following steps:
        1. associating each of said plurality of logical sectors of said subsequent track with an associated LBA of said plurality of data blocks;
        2. determining an earliest of said plurality of logical sectors of said subsequent track which is available to write a data block to;
        3. identifying a LBA corresponding to said earliest of said plurality of logical sectors;
        4. storing a second set of data blocks, said second set comprising a sequence of data blocks having LBAs corresponding to a first logical sector of said subsequent track through a logical sector immediately prior to said earliest of said plurality of logical sectors;
        5. writing a third set of data blocks, said third set comprising a sequence of data blocks having LBAs corresponding to said earliest of said plurality of logical sectors through a final logical sector of said subsequent track;
        6. writing said second set of data blocks, and
        7. determining a plurality of data blocks not already written;
    f. for a last track of said plurality of tracks, performing the following steps:
        1. associating each of said plurality of logical sectors of said last track with a LBA of said plurality of data blocks not already written;
        2. determining an earliest of said plurality of logical sectors of said last track which is available to write a data block to;
        3. if the number of said plurality of data blocks not already written is greater than said earliest of said plurality of logical sectors then performing the following steps:
            i. identifing a LBA corresponding to said earliest of said plurality of logical sectors;
            ii. storing a fourth set of data blocks, said fourth set comprising a sequence of data blocks having LBAs corresponding to a first logical sector of said last track through a logical sector immediately prior to said earliest of said plurality of logical sectors;
            iii. writing a fifth set of data blocks, said fifth set comprising a sequence of data blocks having LBAs corresponding to said earliest of said plurality of logical sectors through a last of said plurality of data blocks not already written, and
            iv. writing said fourth set of data blocks;
        4. if the number of said plurality of data blocks not already written is not greater than said earliest of said plurality of logical sectors then performing the following steps:
            i. waiting for a first logical sector of said last track to become available for writing, and
            ii. writing a sixth set of data blocks, said sixth set comprising a sequence of data blocks having LBAs corresponding to said first logical sector of said last track through a last of said plurality of data blocks not already written.

2. A method of writing data to a disk drive, having a logical track layout based on a read-settle skew value, using a logical write track layout comprising the following steps:
    a. characterizing said disk drive's logical track layout comprising:
        S, the number of logical sectors per track numbered 1 through 8;
        R, the read-settle track skew;
        W, the write-settle track skew, and
        D, wherein D=W−R;
    b. identifying M sequential data blocks, each having an associated LBA, to be written to said disk drive, wherein a first of said M data blocks has an LBA=A;
    c. identifying a first track, T, of said disk drive to begin writing said M data blocks to;
    d. identifying a last track, L, of said disk drive to finish writing said M data blocks to;
    e. determining a number of data blocks, J, selected from said M data blocks to write to said first track T;
    f. writing, onto said first track T, a first sequence of data blocks having LBA=A through LBA=A+J−1 at logical sectors S−J+1 through S, respectively;
    g. storing a second sequence of data blocks having LBA=A+J through LBA=A+J+D−1;
    h. writing, onto a track T+1, a third sequence of data blocks having LBA=A+J+D through LBA=A+J+S−1 at logical sectors 1+D through S, respectively;
    i. writing, onto said track T+1, said second sequence of data blocks at logical sectors 1, through D;
    j. for each track of a plurality of tracks after said track T+1 and before said last track L, performing the following steps:
        1. determining N for each track of said plurality of tracks, where N measures the number of tracks between each said track and said first track T given than N=1 corresponds to said first track T and N=L, corresponds to said last track L;

2. storing a fourth sequence of data blocks having LBA=A+J+(N−2)S through LBA=A+J+(N−2)S+[(N−1)D MOD S]−1;
3. writing, onto track N, a fifth sequence of data blocks having LBA=A+J+[(N−1)D MOD S]+(N−2)S through LBA=A+J+(N−1)S−1 at logical sectors [1+(N−1)D MOD S] through S, respectively, and
4. writing, onto track N, said fourth sequence of data blocks at logical sectors 1 through [(N−1)D MOD S];

k. determining K, where K=[(M−J) MOD S];
l. for said last track L performing the following steps:
 1. if [K>I(L−T)D MOD S] then performing the following steps:
  i) storing a sixth sequence of data blocks having LBA=A+J+(L−T−1)S through LBA=A+J+(L−T−1)S+[(L+T)D MOD S]−1;
  ii) writing onto track L, a seventh sequence of data blocks having LBA=A+J+(L−T−1)S+[(L−T)D MOD S] through LBA=A+M−1 at logical sectors 1+[(L+T)D MOD S] through K, respectively, and
  iii) writing, onto track L, said sixth sequence at logical sectors 1 through [(L−T)D MOD S];
 2. otherwise, perform the following steps:
  i) writing, onto track L, an eighth sequence of data blocks having LBA=A+M−K through LBA=A+M−1 at logical sectors 1 through K, respectively.

* * * * *

UNITED STATES PATENT AND TRADEMARK OFFICE
CERTIFICATE OF CORRECTION

PATENT NO.   : 6,684,287 B1
DATED        : January 27, 2004
INVENTOR(S)  : Spencer Ng It is certified that error appears in the above-identified patent and that said Letters Patent is hereby corrected as shown below:

Title page,
Item [54], Title, "TURNING READ/WRITE PERFORMANCE FOR DISK DRIVES WITH VERY HIGH TRACK DENSITY" should read -- TUNING READ/WRITE PERFORMANCE FOR DISK DRIVES WITH VERY HIGH TRACK DENSITY --

Signed and Sealed this

Third Day of May, 2005

JON W. DUDAS
*Director of the United States Patent and Trademark Office*